United States Patent [19]

Kao

[11] 4,065,546

[45] Dec. 27, 1977

[54] PROCESS FOR PREPARING HALOPHOSPHAZENE MIXTURES

[75] Inventor: James T. F. Kao, Baton Rouge, La.

[73] Assignee: Ethyl Corporation, Richmond, Va.

[21] Appl. No.: 638,375

[22] Filed: Dec. 8, 1975

Related U.S. Application Data

[63] Continuation-in-part of Ser. No. 422,004, Dec. 5, 1973, abandoned.

[51] Int. Cl.$^2$ .............................................. C01B 25/10
[52] U.S. Cl. ..................................... 423/300; 423/302
[58] Field of Search ......................... 423/299, 300, 302

[56] References Cited

U.S. PATENT DOCUMENTS

| | | | |
|---|---|---|---|
| 3,347,643 | 10/1967 | Nielsen | 423/300 |
| 3,667,992 | 6/1972 | Proctor | 423/300 |
| 3,780,162 | 12/1973 | Bergeron et al. | 423/300 |

*Primary Examiner*—O. R. Vertiz
*Assistant Examiner*—Brian E. Hearn
*Attorney, Agent, or Firm*—Donald L. Johnson; John F. Sieberth; James M. Pelton

[57] ABSTRACT

Process for the preparation of chlorophosphazene mixtures having a high proportion of cyclic trimer and tetramer by preparing a dispersion of finely divided ammonium chloride in an amount sufficient to initiate the formation of chlorophosphazene, then, after heating the dispersion to reflux, co-feeding ammonia and a solution of phosphorus pentachloride in a suitable solvent at a rate such that no free $PCl_5$ concentration is allowed to exist in the reaction mass, and then recovering the cyclic chlorophosphazene produced.

7 Claims, No Drawings

PROCESS FOR PREPARING HALOPHOSPHAZENE MIXTURES

CROSS-REFERENCE TO RELATED APPLICATIONS

This application is a continuation-in-part of application Ser. No. 422,004, filed Dec. 5, 1973, now abandoned.

BACKGROUND OF THE INVENTION

This invention relates to the production of chlorophosphazene mixtures, particularly to such mixtures having a high proportion of cyclic trimeric and tetrameric chlorophosphazene. Such products are useful in the preparation of inorganic rubber, as intermediates for agricultural chemicals, as intermediates for fire retardants and as coatings for ceramics and metals.

Because of the various end uses for chlorophosphazenes, extensive research effort has recently been involved in processes for their production. Efforts have been placed on two routes to obtain high cyclic content chlorophosphazenes — i.e., through control of the reaction itself and through post-treatment of the reaction product.

Post treatment of the reaction product has the disadvantage of requiring additional process equipment and higher processing costs, as well as inefficient utilization of reactants and solvents. Control of the reaction itself appears to offer the best route to efficient and economical production of the desired cyclic chlorophosphazene trimer and tetramer mixtures.

The prior art teaches several general approaches to achieve the desired end product through control of the reaction. For example, high dilution of the reactants appears to favor increased cyclic content, Allcock, *Phosphorus-Nitrogen Compounds*, Academic Press, New York (1972), p 122. Also, the use of an excess of finely divided ammonium chloride particles favors increased cyclic content; see U.S. Pat. No. 3,367,750. Further, the slow and even addition of one reactant to the other appears to favor higher cyclic contents, although the prior art differs somewhat on this point. One line of patents indicates that slow and even addition of $PCl_5$ to $NH_4Cl$ favors increased cyclic content; see U.S. Pat. Nos. 3,667,922 and 3,367,750. Another group prefers the addition of $NH_3$ to a solution of $PCl_5$ to increase cyclics; see U.S. Pat. Nos. 3,656,916 and 3,658,487.

Such process conditions provide advantages over classical techniques in which cyclic contents of chlorophosphazene mixtures ranged from 40 to about 65 weight percent cyclics, increasing the cyclic content to from 65 to about 90 weight percent. However, the use of dilute systems has the disadvantage of requiring large volumes of solvent and increased investment required to store, handle and recover the solvent for reuse. Also, the preparation of all of the finely divided ammonium chloride for subsequent reaction makes a thick difficultly stirred slurry. Further, slow additions of the reactants requires increased cycle times. Finally, the cyclic contents produced in such prior art reactions could still be improved.

More recently the yields of cyclic content have been increased by the use of metallic halide catalysts. In U.S. Pat. No. 3,860,693 catalysts such as cobaltous chloride, aluminum chloride, manganous chloride, cupric chloride, stannic chloride magnesium chloride, zinc chloride and titanium chloride are mentioned as effecting increased cyclic content.

Also, U.S. Pat. No. 3,780,162 teaches a process for reacting $PCl_5$ and $NH_4Cl$ wherein an amount of the $NH_4Cl$ sufficient to initiate the reaction is prepared by adding ammonia and hydrogen chloride under pressure and then subsequently adding $PCl_5$ and ammonia to the reactor at specified rates to continue the reaction. The rate of ammonia feed is initially high compared to the phosphorus pentachloride so that large concentrations of $PCl_5$ are not built up. Later the ammonia feed is slowed. Although this process has advantages over other processes, it has the disadvantage that precise control of the feed rates must be maintained to achieve the desired results. Moreover, even when such precise control is achieved a substantial amount of linear species is produced. Thus, there is a need for a process which overcomes the disadvantages of the prior art.

SUMMARY OF THE INVENTION

It has now been discovered that halophosphazene mixtures can be prepared without many of the disadvantages of the prior art processes. More specifically, this invention provides a process for producing high cyclic chlorophosphazene oligomers comprising establishing in a solvent a dispersion of finely divided ammonium chloride in an amount sufficient to initiate the formation of chlorophosphazene, heating said dispersion to the reflux temperature of the solvent, adding to said dispersion ammonia and a solution of phosphorus pentachloride in said solvent at a rate such that no free concentration of phosphorus pentachloride is allowed to exist in the reaction mass, maintaining the reflux temperature for from about $\frac{1}{2}$ to about 2 hours after completing the addition, and recovering the cyclic chlorophosphazene oligomers. Preferably, highly concentrated solutions of $PCl_5$, from 40 up to 60 weight percent may be used. Also, the addition of ammonia is preferably staged such that an initial amount sufficient to make finely divided ammonium chloride to initiate the chlorophosphazene reaction is added, and then the remaining ammonia is added with the phosphorus pentachloride solution, for a total in excess of that theoretically required to produce the chlorophosphazene mixture, said excess being up to about 130 weight percent of the theoretically required amount of ammonia. Preferably, the product chlorophosphazene oligomers are recovered from the reaction mass by filtration, evaporation of the solvent, extraction in a solvent and then evaporation again.

DESCRIPTION OF PREFERRED EMBODIMENTS

According to this invention, there is provided a process for the production of halophosphazene oligomer mixtures, preferably the chlorophosphazene oligomers. Although it should be understood that, in addition, the fluoro- and bromophosphazenes may also be produced according to the process of this invention, for convenience and illustration only all references to the product halophosphazenes will be made by referring to the chlorophosphazene oligomer mixtures. Such chlorophosphazene oligomer mixtures as produced by the process of this invention have a high proportion of cyclic oligomers, such as cyclic trimer, tetramer, pentamer, hexamer, heptamer and the like. Most preferably, the process of this invention produces higher proportions of the cyclic trimer and tetramer, which are shown in the following illustrative structural formulae:

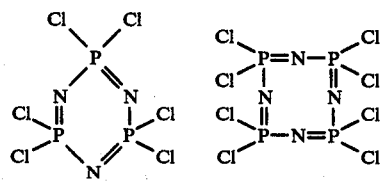

In addition to the cyclic species, small amounts of linear species may also be produced by the process of this invention.

The present invention is directed to a process for producing cyclic chlorophosphazene oligomer mixtures having a high proportion of cyclic trimer and tetramer such that the total cyclic content is greater than about 87 percent by weight and preferably from about 87 up to about 97 weight percent cyclics. Of the total cyclic content of the chlorophosphazene oligomer mixture produced by the present process, the cyclic trimer and tetramer content is greater than about 60 weight percent. Preferably the trimer content ranges from about 60 to about 80 percent and the tetramer content ranges from about 13 to about 20 weight percent, respectively. Percentages by weight of other observed components can have the following ranges:

Cyclic chlorophosphazene pentamer — 6–12%
Cyclic chlorophosphazene hexamer — 0–3%

It should be emphasized that the process of this invention produces mixtures of oligomers, by which is meant relatively low molecular weight species of the recuring unit:

wherein $n$ ranges from 3 to about 7. This should be contrasted with those polymers of chlorophosphazene which are in the medium or high molecular weight ranges, e.g., where $n$ is in the range from 20–100,000 or greater. Whereas the high molecular weight products are truly polymeric in character, the products produced by the present process are oligomers, having very few recurring units and are not polymeric in character.

According to the present invention, the process is carried out by preparing an initial amount of finely divided ammonium halide dispersed in a suitable solvent. For convenience, the ammonium halide will be referred to as the ammonium chloride, although the fluoride and bromide can be employed as well. As shown in the prior art, finely divided ammonium chloride has high surface area and provides increased reactivity in the production of chlorophosphazenes. Preferably, but without limiting the invention the ammonium chloride prepared in the initial stage of the process of this invention has a particle size which is usually greater than about 10 microns and the particle size can range upward to about 50 microns or greater. However, as the particle size of ammonium chloride increases the reaction rate will begin to decrease. Also, the yield of cyclic chlorophosphazene will be affected by the particle size of ammonium chloride used, because the total cyclic content is affected by the way in which the reaction proceeds.

The preparation of the initial amount of ammonium chloride is effected by reacting hydrogen chloride and ammonia in a suitable solvent according to methods described in the prior art. Generally, equimolar amounts of ammonia and hydrogen chloride are employed, but usually a slight excess of hydrogen chloride is used to assure complete conversion of ammonia. Preferably, both the hydrogen chloride and ammonia are used in the form of dry gases.

The amount of ammonium chloride prepared initially should be sufficient to initiate the chlorophosphazene reaction. Generally, from about 10 to about 65 weight percent of the total amount of ammonia can be added at this stage of the reaction. More preferably, from about 10 to about 45 weight percent of the total amount of ammonia can be initially added.

Solvents useful in this process have boiling points which allow the reaction of phosphorus pentachloride and ammonium chloride to proceed preferably under reflux conditions, are inert to the raw materials and reaction products and also are effective solvents for phosphorus pentachloride. Lastly, the solvent boiling point should be sufficiently low that the solvent may be removed afterwards from the crude chlorophosphazene polymer without further polymerization. The solvent should be inert to the products and reactants. Inert, inorganic solvents can be used; also inert oxygenated and halogenated, preferably chlorinated, organic solvents are suitable. The solvents are such that alone or in the presence of the chlorophosphazene polymers in the reaction system the solvent or reaction system has a boiling point in the range of 110° to about 200° C. For example, phosphorus oxychloride or phosphorus trichloride can be used as inert inorganic solvents. Of the halogenated hydrocarbons useful as solvents in the process of this invention there can be mentioned aliphatic and aromatic halogenated compounds, preferably chlorinated and aromatic hydrocarbyl compounds, of which symmetrical tetrachloroethane, tetrachloroethylene, chloroform, carbon tetrachloride and the like are examples of suitable alkyl chloride solvents. Particularly preferred halogenated aromatic solvents are chlorinated mononuclear aromatic hydrocarbon compounds of which trichlorobenzene, orthodichlorobenzene, monochlorobenzene and the like are typical. Most especially preferred is chlorobenzene, since it offers a comparatively low boiling point, is economical, less toxic than tetrachloroethane and readily available. In addition to the chlorinated hydrocarbons, aromatic or aliphatic hydrocarbon solvents such as toluene, heptane, octane and the like can also be used. All of the above listed solvents are suitable for the chlorophosphazene reaction and as well can be used in further reaction of the chlorophosphazene to alkoxy or aryloxy phosphazenes. Thus, it is clear that the identity of the solvent is not critical to the process, but a suitable solvent can be selected based on practicality, economy and safety considerations.

The amount of hydrogen chloride used to prepare the initial amount of ammonium chloride is that amount sufficient to react with the ammonia employed. Generally, the solvent is charged to the reactor and then the hydrogen chloride feed is started, allowing the solvent to become saturated with hydrogen chloride. Then the ammonia feed is begun. At this point the hydrogen chloride feed is adjusted to balance the ammonia feed. Typically, both the hydrogen chloride and ammonia are introduced under the surface of the solvent and sufficient agitation is provided to insure good contact of the reactants. Agitation can be conveniently provided by conventional means, such as a stirrer, impeller, rotating baffle or the like. The feed rates of hydrogen chloride and ammonia for the initial amount of ammonium chloride are not critical. However, they should be low enough to avoid blowing the ammonium chloride produced out of the reactor, but high enough to assure practical reaction times.

The ammonium chloride reaction is begun at ambient temperature. However, the exothermic nature of the reaction will soon heat the reaction mixture to from about 80° to 121° C depending on the reactor size. Although prior art references, specifically U.S. Pat. No. 3,367,750 hereinabove mentioned, teach that for good conversion of ammonium chloride to chlorophosphazene, it is necessary to maintain the reaction mixture at room temperature, it has been discovered and found advantageous from a process standpoint to allow the heat of the reaction to increase the temperature of the reaction mixture to above 80° C and then near completion of the reaction to apply additional heat to bring the mixture to reflux, if the temperature of the system is below the reflux temperature. Therefore, it is preferred that during the preparation of the initial amount of ammonium chloride that the temperature of the reaction mixture is allowed to gradually increase throughout the reaction until the reflux temperature of the system is attained at the end of the reaction.

On completion of the reaction to prepare the ammonium chloride, the chlorophosphazene reaction is begun. This is accomplished by adding ammonia and a solution of phosphorus pentahalide in a suitable solvent to the reactor in the presence of the initially prepared ammonium chloride at a temperature sufficient to attain good reaction rates. As previously mentioned with the other reactants, the phosphorus pentahalide could be the fluoride, chloride or bromide or mixtures of these. However, for consistence and convenience, the process will be illustrated by reference to the phosphorus pentachloride.

The phosphorus pentachloride solution can be conveniently prepared by adding phosphorus pentachloride to the solvent and heating the system until the phosphorus pentachloride has dissolved in the solvent. Another method for preparing the solution is to add the desired amount of phosphorus trichloride to the solvent and chlorinate according to methods known in the art until the phosphorus pentachloride solution is formed. Solvents such as those described hereinabove are useful in this step of the process of this invention.

One advantage of the process of this invention is that a more concentrated system can be used in direct contradiction to the teaching of the prior art. Thus, whereas, for example, the prior art teaches conducting the chlorophosphazene reaction at high dilution (see Allcock, supra), using $PCl_5$ solutions in monochlorobenzene having a $PCl_5$ concentration of about 25 weight percent (see U.S. Pat. No. 3,367,750), and starting with not too concentrated solutions of $PCl_5$, e.g., at about 14 weight percent of $PCl_5$ in sym-tetrachloroethane (see U.S. Pat. No. 3,656,916), the process of this invention can employ starting solutions of $PCl_5$ in an inert solvent, preferably monochlorobenzene, at much higher concentrations and still obtain product chlorophosphazene oligomer mixtures having a high proportion of cyclic trimer and tetramer. Preferably, the concentration of $PCl_5$ in solvent can be from about 40 to about 70 weight percent. More preferably, the concentration of $PCl_5$ ranges from about 50 to about 60 percent. The useful concentration of $PCl_5$ in solvent depends to a certain extent on the temperature at which the solution is made. By way of illustration, the solubility of $PCl_5$ in monochlorobenzene can range from 40 weight percent at 80° C to about 70 weight percent at 125° C. Therefore, the preparation of the concentrated $PCl_5$ solution for use in the process of this invention can be conveniently carried out at elevated temperatures, for example at temperatures from about 80° to about 125° C.

After the $PCl_5$ solution in an inert solvent has been prepared, it is fed with the remaining ammonia to the ammonium chloride dispersion. The rate of feed of $PCl_5$ solution is critical and must be that rate at which no free concentration of $PCl_5$ is allowed to build up the reactor. In other words, as the $PCl_5$ solution and ammonia are fed to the reactor, the chlorophosphazene reaction occurs and the $PCl_5$ and ammonia are consumed. Because the chlorophosphazene formation is an endothermic reaction one limitation on the feed rate of $PCl_5$ solution is the amount of heat which can be put into the reaction mixture. Enough heat should be supplied to maintain the reaction mixture at reflux temperature conditions for best results. Another consideration is the rate of ammonia feed. It is preferable to have an excess of ammonia. Considerations of reactor design and size which will provide practical reaction rates will influence the feed rate of $PCl_5$ solution and ammonia. In general, the $PCl_5$ solution is fed to the reactor over a period of from about 2 to about 6 hours. Of course, the feed rate will depend on the concentration of $PCl_5$ solution with lower concentrations being capable of higher feed rates and higher concentrations being fed at lower rates. Preferably, the $PCl_5$ solution is fed to the reactor over a period of from about 3 to about 6 hours.

During the feed of $PCl_5$, the remaining ammonia is also fed to the reactor. Preferably, the ammonia and the phosphorus pentachloride solutions are simultaneously added. Usually, the amount of ammonia required is only the theoretical amount necessary to react with the $PCl_5$. However, to insure that no free $PCl_5$ concentration builds up, an excess of ammonia is generally used. Therefore, the total amount of ammonia fed to the reactor, including both ammonia required for ammonium chloride preparation and ammonia added with the $PCl_5$ solution, can range from theoretical to about 80 weight percent excess. Preferably, the total amount of ammonia employed can be from the theoretical amount required to react with the $PCl_5$ to about 30 weight percent above the theoretical amount.

To maintain in the reactor at all times a concentration of ammonia sufficient to react with the $PCl_5$ as it is fed, the ammonia addition is preferably completed prior to feeding all of the $PCl_5$ solution. Typically, the rate of ammonia addition required is only that sufficient to prevent build up of free $PCl_5$ concentration in the reactor. In general, the rate of ammonia feed can range from about 10 grams per hour to about 25 grams per hour per mole of $PCl_5$ fed to the reaction mixture.

After all reactants have been added to the reactor, the temperature and agitation are maintained for an additional period to aid in finishing of the reaction. Generally, the reflux conditions are maintained for a period of from about ½ to about 1½ hours. After this holding period, the reaction mixture is cooled to ambient conditions and the cyclic chlorophosphazene oligomer mixture recovered.

The chlorophosphazene may be recovered from the reaction mixture according to conventional methods described in the literature. Because of the use of excess ammonia, a slurry of ammonium chloride remains in the reactor from which the product can be separated by settling and decantation or filtration or a combination of both these methods. Washing the ammonium chloride filter cake with an additional amount of solvent after the filtration step allows recovery of an additional amount of product. The ammonium chloride can then be discarded or recycled as the initial amount of ammonium chloride for starting another run.

The filtrate and the recovered washing solution or the clean solution from decantation contain the product cyclic chlorophosphazenes and solvent. The solvent can be separated from the product by evaporation, distillation or the like. It is preferred to carry out such separations at moderate temperatures to prevent distillation of the lower cyclic chlorophosphazene such as trimer. Preferably, the separation can be made by evaporation at lower temperatures than the reaction temperature and under reduced pressure, more preferably at temperatures from about 50° to about 100° C and pressures from about 1 to about 50 mm of mercury. The chlorophosphazene product is essentially solvent free and contains from 87 to about 99 weight percent cyclic chlorophosphazene oligomers. For product produced at the lower end of the range it may be desired to extract the chlorophosphazene with a suitable hydrocarbon solvent, such as ligroin, hexane, petroleum ether or the like to remove linear products and increase the cyclic chlorophosphazene content.

The process of the present invention will be more clearly set forth in accordance with the following illustrative and non-limiting examples.

EXAMPLE 1

To a 1-liter glass reactor fitted with a stirrer, thermometer, an overhead condenser, and two dip legs as feeding tubes was charged 281 grams of monochlorobenzene (MCB). Then while dry HCl gas was bubbled into the reactor through one dip leg for 2–3 minutes at a rate of about 0.5 grams per minute, ammonia gas was bubbled through the other dip leg at a rate of about 0.23 grams per minute for 35 minutes providing a total of 8.2 grams (0.48 mole) of ammonia. The HCl feed rate was adjusted to balance the $NH_3$ feed so that $NH_4Cl$ dust was not blown out of the reactor. The heat of reaction of HCl and $NH_3$ increased the slurry temperature to about 80° C. Near the end of the $NH_3$ feed heating was applied to bring the slurry of $NH_4Cl$ in MCB to reflux.

In a separate reactor, 376 grams (1.8 mole) of $PCl_5$ was added to 281 grams of MCB and heated until the $PCl_5$ was dissolved providing a 55 weight percent solution of $PCl_5$ in MCB. The hot $PCl_5$ solution was fed evenly over 6 hours to the first reactor while 30.8 grams (1.81 moles) of $NH_3$ was added during the first 4 hours. The HCl feed was shut off at the beginning of the $PCl_5$ addition. Thus, the total amount of ammonia fed was 2.29 moles or about 27 weight percent excess over the theoretical amount of ammonia required.

After $PCl_5$ solution was added the temperature of the reaction mass was maintained for 30 minutes. Then the reactor was cooled to room temperature. The slurry was allowed to settle and the clear top layer of liquid was siphoned off. The MCB was evaporated at 60° C and 3 mm Hg pressure yielding 52% product based on the $PCl_5$ fed. The residual slurry was filtered, washed with MCB and evaporated to yield additional product which was analyzed to have the same composition as the crop from the clear top layer. The products were combined to give 88% overall yield. The combined product was extracted with three parts of petroleum ether (boiling range 40°–60° C). The clear ether solution was evaporated to yield cyclic chlorophosphazene mixture which was 95% of the original crude product. Vapor phase chromatographic analysis of the ether soluble portion gave the total cyclic content of the product as 96.9% of which 77.4% was cyclic trimer, 13.6% was cyclic tetramer, 5.6% was cyclic pentamer and 0.3% was cyclic hexamer. The yield of cyclic trimeric phosphonitrilic chloride was 64.7%.

For comparison, Example 2 was run following the procedure set forth in U.S. Pat. No. 3,367,750.

EXAMPLE 2 — COMPARATIVE

To a 1-liter glass reaction flask, as described in Example 1 hereinabove, was added 281 grams of monochlorobenzene. Then 40.2 grams of HCl and 18.7 grams of $NH_3$ were fed over a 2-hour period until a thick slurry of ammonium chloride was obtained. The heater was turned on during the last 30 minutes of feeding to raise the temperature of the reaction mass from 94° C up to about 124° C.

Then a solution of 188 grams of $PCl_5$ in 281 grams of MCB was made by mixing the two and heating to 95° C. The $PCl_5$ concentration was about 40 weight percent. The $PCl_5$ solution was fed into the $NH_4Cl$ slurry over a period of 2 hours and 20 minutes. After the $PCl_5$ was fed the temperature of the reactor contents was maintained at about 135° C for about 1 hour.

The reaction mass was then cooled to room temperature and the product liquid filtered from the solid $NH_4Cl$ residue. Also, it was noted that a gel remained with the $NH_4Cl$ residue. The filtrate was evaporated to give 62% yield. The crude solid product chlorophosphazenes were extracted twice with petroleum ether. The petroleum ether was evaporated and 62 grams of product cyclic chlorophosphazenes were recovered equivalent to 98% of the crude product. Analysis of the ether soluble portion by vapor phase chromatograph gave the following results of cyclic chlorophosphazenes. Trimer content — 62.5%; tetramer content — 19.7%; pentamer content —12.2%. The total cyclics content was 94.4%. The yield of cyclic trimeric phosphonitrilic chloride was 38%.

Thus, from a comparison of Examples 1 and 2, it can be observed that in Example 1 a slightly higher total cyclic content of the ether soluble portion was obtained, 96.9 versus 94.4; also the content of cyclic trimer was higher, 77.4% versus 62.5%; that the concentration of $PCl_5$ was higher, 60% versus 40%, allowing better productivity and using less solvent per unit weight of $PCl_5$, and the yield of cyclic trimeric chlorophosphazene was much higher, 64.7% versus 38.0%, in Example 1 compared to Example 2.

Using the same general procedure described in Example 1 above, various conditions of the reaction including $PCl_5$ feed time, $PCl_5$ concentration, amounts of $NH_3$ initially fed, co-feed with $PCl_5$ solution were investigated. The results are shown in Table I below. In each experiment, equal amounts of monochlorobenzene solvent were used in making the $NH_4Cl$ slurry and the $PCl_5$ solution.

TABLE 1
PREPARATION OF PNCL$_2$

| Example No. | 3 | 4 | 5 | 6 | 7 | 8 | 9 |
|---|---|---|---|---|---|---|---|
| NH$_3$, of Theory | 179 | 141 | 144 | 136 | 154 | 131 | 133 |
| Initial Feed, % | 107 | 28 | 65 | 52 | 52 | 33 | 30 |
| Co-Feed, % | 72 | 113 | 79 | 84 | 102 | 98 | 103 |
| PCl$_5$ Conc., Wt % | 40 | 40 | 40 | 40 | 40 | 40 | 40 |
| PCl$_5$ Feed Time, Hrs. | 2 | 3 | 2 | 3 | 2-1/3 | 2-1/6 | 2-1/3 |
| Total Cycle Time, Hrs.$^a$ | 5 | 4-1/2 | 3-1/2 | 4-1/2 | 4 | 3-1/6 | 3-1/2 |
| Yield, %$^b$ | 88 | 86 | 92 | 85 | 80 | 80 | 86 |
| Ether Extraction$^c$ | | | | | | | |
| % Soluble | 99 | 92 | 95 | 97 | 98 | 96 | 95 |
| Ether Soluble Solid | | | | | | | |
| 3 | 71.1 | 70.2 | 67.7 | 61.2 | 58.3 | 64.6 | 74.1 |
| 4 | 14.4 | 14.2 | 16.6 | 18.8 | 17.0 | 17.4 | 14.1 |
| 5 | 7.8 | 6.9 | 10.6 | 11.0 | 11.3 | 9.3 | 7.1 |
| 6 | — | — | — | 0.5 | 0.5 | 0.2 | 0.2 |
| Total Cyclics | 93.3 | 90.3 | 94.9 | 91.5 | 87.1 | 91.5 | 95.5 |

| Example No. | 10 | 11 | 12 | 13 | 14 | 15 | 16 |
|---|---|---|---|---|---|---|---|
| NH$_3$, % Theory | 110 | 131 | 126 | 100 | 100 | 100 | 130 |
| Initial Feed, % | 10 | 30 | 30 | (30)$^f$ | (30)$^g$ | 30 | 30 |
| Co-Feed, % | 100 | 101 | 96 | 100 | 100 | 70 | 100 |
| PCl$_5$ Conc., Wt % | 40 | 50 | 50 | 50 | 50 | 57 | 57 |
| PCl$_5$ Feed Time, Hrs. | 3-1/2 | 3-1/6 | 3-3/4 | 5 | 4-1/2 | 6-1/2 | 5 |
| Total Cycle Time, Hrs.$^a$ | 4-1/6 | 4-1/3 | 4-3/4 | 6-1/2 | 5 | 7-1/2 | 6 |
| Yield, %$^b$ | 83 | 94$^d$ | 93$^e$ | (82)$^d$ | (106)$^e$ | 79 | 88 |
| Ether Extraction$^c$ | | | | | | | |
| % Soluble | 92 | 96 | 93 | 92 | 92 | 73 | 94 |
| Ether Soluble Solid | | | | | | | |
| 3 | 70.9 | 63.7 | 65.8 | 67.0 | 75.3 | 60.0 | 70.6 |
| 4 | 15.0 | 15.6 | 14.9 | 15.6 | 13.1 | 13.6 | 15.1 |
| 5 | 7.6 | 8.1 | 7.8 | 8.0 | 6.2 | 6.8 | 7.4 |
| 6 | — | 1.0 | 0.4 | 0.3 | — | 3.0 | 0.4 |
| Total Cyclics | 93.5 | 88.4 | 88.9 | 90.9 | 94.6 | 83.4 | 93.5 |

$^a$Total cycle time = initial NH$_3$ feed time + PCl$_5$ feed time + 30 min. reflux.
$^b$Based on PCl$_5$ fed.
$^c$Three parts petroleum ether + 1 part product.
$^d$Cake was washed with MCB.
$^e$Only the top clear liquid.
$^f$Used the NH$_4$Cl cake from Example 1, number in parenthesis represents ammonia used to make NH$_4$Cl in that run.
$^g$Used the NH$_4$Cl slurry from Example 13, number in parenthesis represents ammonia used to make NH$_4$Cl in that run.

From the foregoing description, one skilled in the art can readily envision variations of the process within the scope of this invention. Therefore, the process of this invention is limited only by the scope of the following claims.

I claim:

1. A process for producing high cyclic chlorophosphazene oligomers having the recurring unit $+\text{NPCl}_2)_n$ wherein n ranges from 3 to about 7, said process comprising establishing in an inert solvent a dispersion of finely divided ammonium chloride in an amount sufficient to initiate formation of chlorophosphazene by reacting hydrogen chloride with from about 10 to about 65 weight percent of the total ammonia used in the process, heating said dispersion to the reflux temperature of the solvent, adding simultaneously to said dispersion phosphorus pentachloride as a solution of from about 40 to about 70 weight percent of phosphorus pentachloride in an additional amount of said solvent at a rate such that no free concentration of phosphorus pentachloride is allowed to exist in the reaction mass and ammonia such that the total amount of ammonia employed for both the formation of ammonium chloride and the chlorophosphazene is from the theoretical amount required to react with phosphorus pentachloride to about 30 percent by weight in excess of the theoretical amount, maintaining the reflux temperature for from about ½ to about 2 hours after completing the addition and recovering the cyclic chlorophosphazene oligomers.

2. The process of claim 1 in which the total amount of ammonia added is in excess of the theoretically required amount to react with the phosphorus pentachloride.

3. The process of claim 1 in which the concentration of said phosphorus pentachloride in said solution is from about 40 to about 60 percent by weight.

4. The process of claim 1 in which said ammonium chloride dispersion is established by adding hydrogen chloride and ammonia to said solvent, the amount of ammonia used being from about 10 to about 45 percent by weight of the total ammonia used in said process.

5. The process of claim 1 wherein the temperature of finely divided ammonium chloride dispersion is increased to above 80° C by the heat of the ammonium chloride formation reaction.

6. The process of claim 1 in which the ammonia and phosphorus pentachloride solution is fed to the reaction mixture for a period of from 2 to about 6 hours.

7. The process of claim 1 in which the total amount of ammonia employed ranges from the theoretical amount required to react with said phosphorus pentachloride to about 30 percent by weight in excess of the theoretical amount, with from about 10 to about 65 percent by weight of the total ammonia being used to establish the dispersion of finely divided ammonium chloride and the remaining ammonia being added to the reaction mixture simultaneously with said phosphorus pentachloride.

* * * * *